April 30, 1935. D. PYZEL 1,999,546
PROCESS FOR THE ABSORPTION AND DISTILLATION OF AMMONIA
Filed June 7, 1932
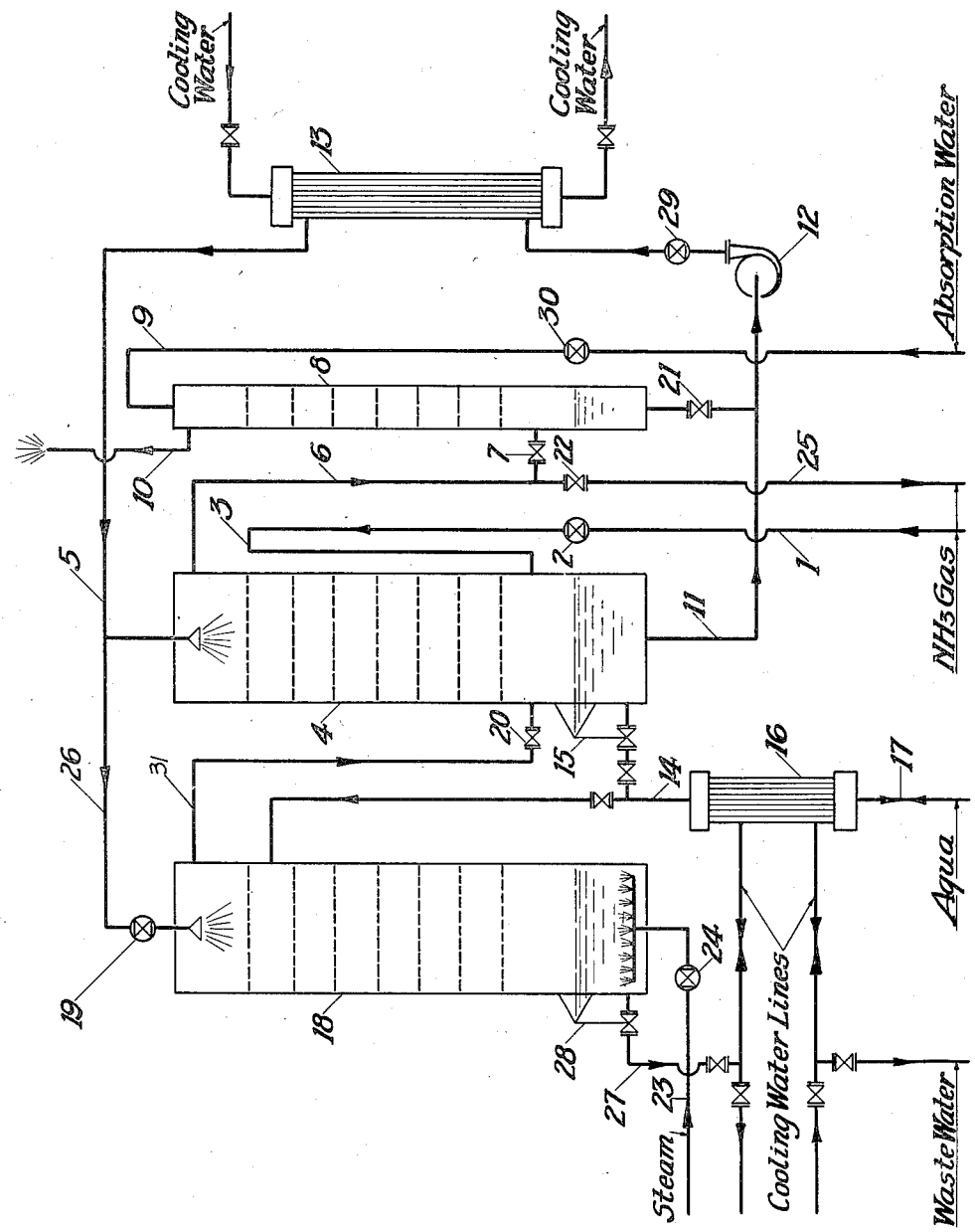
Inventor. Daniel Pyzel
Attorney.

Patented Apr. 30, 1935

1,999,546

UNITED STATES PATENT OFFICE 1,999,546

PROCESS FOR THE ABSORPTION AND DISTILLATION OF AMMONIA

Daniel Pyzel, Piedmont, Calif., assignor to Shell Development Company, San Francisco, Calif., a corporation of Delaware Application June 7, 1932, Serial No. 615,807

2 Claims. (Cl. 23—193)

In plants for the production of ammonia and its products which comprise an ammonia synthesis unit and various units using ammonia as a raw material, economical operation necessitates that suitable means for storing ammonia be provided so that, in case of shut down of either the ammonia producing or ammonia utilizing units for necessary repairs or fluctuating consumption, et cetera, the remaining unit or units can operate for a time without the aid of the other.

Some of the more recent processes for ammonia synthesis produce the ammonia in the gaseous state. This ammonia gas could be stored as liquid anhydrous ammonia but this necessitates liquefying the gas and storing the resultant liquid anhydrous ammonia in pressure vessels. The above method, however, is expensive and cumbersome. The ammonia gas could also be stored as a gas but the space required would be too great.

The easiest method of storing the ammonia gas is to absorb it in water forming aqua ammonia. This aqua ammonia can be stored in ordinary storage tanks. The gaseous ammonia can be readily obtained again when required by distillation of the aqua ammonia.

It is a purpose of this invention to devise a process for the production of aqua ammonia from gaseous or liquid ammonia.

It is a further purpose of this invention to provide a process and apparatus suitable for the alternative formation of aqua ammonia from pure ammonia and the formation of gaseous ammonia from aqua ammonia.

The further objects and advantages of my invention will be more fully understood from the following detailed description throughout which reference is made to the accompanying drawing which shows a typical arrangement of my apparatus. In this description it should be understood that although the terms "tower", "bubble column" and "stripper" are each used for certain parts of the apparatus, such use is solely for the sake of clearness of description as various types of towers or columns can be used at these points.

In operating so as to form aqua ammonia, ammonia gas is conducted into the apparatus through line (1). This gas after passing through a suitable control valve (2) passes by way of inverted U (3) into the lower portion of tower (4). Aqua ammonia of medium strength is sprayed into the top of this tower from line (5). The major part of the ammonia entering the tower is absorbed by the medium strength aqua ammonia flowing down through the tower. The resulting strong aqua ammonia collects in the bottom of the tower.

The presence of non-condensible gases such as, hydrogen, nitrogen, et cetera, in the ammonia gas will prevent the complete absorption of ammonia in tower (4). The unabsorbed ammonia and non-condensible gases are led off from the top of tower (4) through pipe (6) and valve (7) into the lower portion of a scrubber (8). The gas mixture passes upward countercurrent to water sprayed into the scrubber from line (9) controlled by valve (30). The gases not absorbed are vented to the atmosphere through pipe (10).

Strong aqua ammonia collects in the bottom of tower (4) and is withdrawn through pipe (11) and forced by means of pump (12) through cooler (13). The cooled aqua ammonia is passed into line (5) and sprayed into the top of tower (4) as above mentioned. The dilute aqua ammonia collecting in the bottom of the scrubber (8) also flows into line (11) and mixes with the strong aqua ammonia circulating stream.

In this manner the required quantity of water for absorption first serves to scrub the outgoing non-condensible gases and thereafter takes up its full quota of ammonia gas while flowing down through the tower (4) intermixed with the circulating solution which serves to carry off the heat of absorption.

Strong aqua ammonia is continually withdrawn from the bottom of tower (4) through pipe (14). The amount of aqua ammonia withdrawn is regulated by means of a float valve indicated at (15). The aqua ammonia drawn off is cooled by being passed through heat exchanger (16) countercurrent to cooling water and is then run to storage through line (17).

The concentration of the aqua ammonia produced is regulated by controlling the temperature in the bottom of tower (4). This temperature control is in turn effected by regulating the rate of flow of the circulating stream which can be accomplished by valve (29). If the top of tower (4) is kept as cool as possible it will prevent too large a quantity of ammonia from being carried over into the scrubber (8) by the non-condensible gases.

When it is desired to obtain gaseous ammonia from aqua ammonia the equipment is augmented by a bubble column (18) by opening valves (19) and (20). The scrubber (8) is cut off from the system by closing valves (7) and (21), and opening valve (22). The process then operates as follows:

The aqua ammonia is pumped from storage through line (17) into heat exchanger (16) where it is heated by being passed countercurrent to hot water leaving the bubble column (18). The heated aqua ammonia passes into the upper portion of the bubble column (18) while at the same time steam is injected into the bottom of the bubble column through line (23) controlled by a valve (24). The steam passing upward through the column heats the aqua ammonia flowing downward causing ammonia gas together with some water vapor to be driven off. This gas-vapor mixture flows from the bubble column through line (31) into the bottom section of tower (4).

The ammonia gas and water vapor passing upward through the tower (4) is cooled by a downward flowing stream of cold aqua ammonia. By this step the major part of the water vapor and some of the ammonia are condensed so that the ammonia gas leaving tower (4) through the (6) and valve (22) is substantially free from water vapor. The ammonia gas is carried through pipe (25) to ammonia consuming units. The cooling in tower (4) is accomplished by means of a rapidly circulating stream of aqua ammonia which is withdrawn from the bottom of tower (4) pumped through cooler (13) and sprayed into the top of the tower from pipe (5). Part of the cooled aqua ammonia is led from line (5) into the top of bubble column (18) through line (26) controlled by valve (19). The aqua ammonia thus sprayed into the bubble column serves as reflux material.

The water entering the system as aqua ammonia, freed from its contained ammonia gas in the bubble column (18), collects in the bottom of the column. This hot water is continually withdrawn through line (27) and passed through heat exchanger (16) where it gives up most of its heat content to the fresh aqua ammonia entering the system. The level of the water in the bottom of the column is controlled by means of a suitable float valve (28). At least sufficient steam is injected into bubble column (18) through line (23) to maintain the water collecting in the bottom of the column at its boiling point.

One of the chief advantages of my invention is that the apparatus provides a means for either distillation or absorption processes utilizing a minimum of equipment.

Another advantage is that the system of indirect cooling by a circulating stream of aqua ammonia, when distilling serves to cool the ammonia gas, and to produce a condensate suitable for reflux. When absorbing, the circulating stream of aqua ammonia serves to remove the heat of reaction of the ammonia gas and the water. My process is also particularly suitable for large scale production of ammonia from aqua ammonia or the reverse process.

The further advantages of my invention will be apparent to those skilled in the art.

I claim as my invention:

1. Process for the manufacture of aqua ammonia comprising introducing a stream of dilute aqua ammonia into the top of an absorber, passing ammonia gas countercurrent to the aqua ammonia introduced, withdrawing a stream of saturated aqua ammonia from the bottom of the absorber, conducting part of the saturated stream away from the system, mixing the remainder of the saturated stream with dilute aqua ammonia, cooling the resultant stream and returning it to the top of the absorber.

2. In a process for the manufacture of aqua ammonia the steps comprising withdrawing a stream of hot saturated aqua ammonia from the bottom of an absorber, mixing amounts of aqua ammonia from a second absorber with said hot saturated stream, cooling the resultant stream and introducing the same into the top of the first mentioned absorber countercurrent to ammonia gas.

DANIEL PYZEL.